US006957886B2

(12) United States Patent
Alfekri et al.

(10) Patent No.: US 6,957,886 B2
(45) Date of Patent: Oct. 25, 2005

(54) APPARATUS AND METHOD OF INKJET PRINTING ON UNTREATED HYDROPHOBIC MEDIA

(75) Inventors: Dheya Alfekri, San Diego, CA (US); Minh C. Duong, San Diego, CA (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/256,963

(22) Filed: Sep. 27, 2002

(65) Prior Publication Data

US 2004/0061752 A1 Apr. 1, 2004

(51) Int. Cl.[7] ................................................. B41J 2/01
(52) U.S. Cl. ....................... 347/102; 347/100; 347/101
(58) Field of Search ................... 347/100, 101, 347/102, 95, 96, 105; 106/31.13, 31.6, 31.27; 523/160; 235/491, 487, 468; 250/271

(56) References Cited

U.S. PATENT DOCUMENTS

| 4,970,528 | A | | 11/1990 | Beaufort et al. | |
|---|---|---|---|---|---|
| 5,133,803 | A | | 7/1992 | Moffatt | |
| 5,364,462 | A | | 11/1994 | Crystal et al. | |
| 5,406,321 | A | | 4/1995 | Schwiebert et al. | |
| 5,485,182 | A | | 1/1996 | Takayanagi et al. | |
| 5,570,118 | A | * | 10/1996 | Rezanka et al. | 347/100 |
| 5,734,392 | A | * | 3/1998 | Cornell | 347/17 |
| 5,900,899 | A | * | 5/1999 | Ichizawa et al. | 347/100 |
| 5,974,298 | A | * | 10/1999 | Urban et al. | 399/401 |
| 6,199,978 | B1 | | 3/2001 | Ishi et al. | |
| 6,239,193 | B1 | | 5/2001 | Cheng et al. | |
| 6,296,350 | B1 | | 10/2001 | Cornell et al. | |
| 6,357,863 | B1 | | 3/2002 | Anderson et al. | |
| 6,382,759 | B2 | | 5/2002 | Maeda et al. | |
| 6,390,618 | B1 | * | 5/2002 | Wotton et al. | 347/102 |
| 6,426,375 | B1 | | 7/2002 | Kubota | |
| 6,428,158 | B1 | * | 8/2002 | Szlucha | 347/102 |
| 6,530,657 | B2 | * | 3/2003 | Polierer | 347/102 |
| 6,646,024 | B2 | * | 11/2003 | Beach et al. | 523/160 |
| 2002/0109767 | A1 | | 8/2002 | Polierer | |

FOREIGN PATENT DOCUMENTS

| FR | 2817797 | 4/2002 |
|---|---|---|
| GB | 2211471 | 5/1989 |

* cited by examiner

Primary Examiner—Manish S. Shah
(74) Attorney, Agent, or Firm—William R. Zimmerli

(57) ABSTRACT

An apparatus and method of thermal inkjet printing is provided. The apparatus is adapted to be used with an inkjet ink including a pigment(s), an aqueous vehicle, and a sufficient amount of polymeric binder and/or humectant(s) to wet and directly adhere to non-porous, uncoated, untreated, hydrophobic media. The ink is adapted to be ejected through a thermal inkjet head with consistent image quality and no kogation. The concentration of binder and/or humectant(s) raises the viscosity of the ink at room temperature. As such, the apparatus is adapted to lower the viscosity of the ink prior to the ink being ejected through the thermal inkjet printhead. Additionally, the apparatus is adapted to prepare the media for receiving the ink, and dry the ink after the ink is deposited on the media. This can be accomplished by providing heat to the media and/or the ink during the printing process.

27 Claims, 7 Drawing Sheets

APPARATUS AND METHOD OF INKJET PRINTING ON UNTREATED HYDROPHOBIC MEDIA

FIELD OF THE INVENTION

This invention relates generally to the field of digitally controlled printing devices, and in particular to drop on demand inkjet printers, inks, and printer components

BACKGROUND OF THE INVENTION

Traditionally, digitally controlled printing capability is accomplished by one of two technologies. The first technology, commonly referred to as continuous stream or continuous inkjet printing, uses a pressurized ink source which produces a continuous stream of ink drops. The ink drops are directed to an appropriate location using one of several methods (electrostatic deflection, heat deflection, gas deflection, etc.). When no print is desired, the ink drops are deflected into an ink capturing mechanism (catcher, interceptor, gutter, etc.) and either recycled or disposed of. When print is desired, the ink drops are not deflected and allowed to strike a print media. Alternatively, deflected ink drops can be allowed to strike the print media, while non-deflected ink drops are collected in the ink capturing mechanism.

The second technology, commonly referred to as drop on demand inkjet printing, provides ink drops for impact upon a recording surface using a pressurization actuator (thermal, piezoelectric, etc.). Selective activation of the actuator causes the formation and ejection of an ink drop through a nozzle bore that strikes the print media. The formation of printed images is achieved by controlling the individual formation of ink drops, as is required to create the desired image. Typically, a slight negative pressure within each channel keeps the ink from inadvertently escaping through the nozzle bore, and also forms a slightly concave meniscus at the nozzle, thus helping to keep the nozzle clean.

Conventional drop on demand inkjet printers utilize a pressurization actuator to produce the inkjet drop at orifices of a print head. Typically, one of two types of actuators are used including heat actuators and piezoelectric actuators. With piezoelectric actuators, an electric field is applied to a piezoelectric material possessing properties that create a mechanical stress in the material causing an ink drop to be expelled. The most commonly produced piezoelectric materials are ceramics, such as lead zirconate titanate, barium titanate, lead titanate, and lead metaniobate. With heat actuators, a heater, placed at a convenient location, heats the ink causing a quantity of ink to phase change into a gaseous steam bubble that raises the internal ink pressure sufficiently for an ink drop to be expelled.

It is known to print directly to hydrophobic media, such as vinyl, etc., using solvent-based dye inks ejected from piezoelectric inkjet printheads. However, due to the high cost of piezoelectric printer systems (ranging from $20,000 to $100,000) these printers are too costly for small volume printing jobs and some industry operating environments, such as small shop environments, etc. Piezoelectric printer systems typically require an ink (often solvent based) having a high viscosity which are not suitable for use with thermal inkjet printing systems. Additionally, the cost associated with piezoelectric printer systems can be contrasted with the cost associated with thermal inkjet printing systems which typically range from $10,000 to $15,000.

In order to solve this industry problem, an affordable inkjet printer that prints directly on untreated and uncoated hydrophobic media, such as vinyl, etc., and still offers a competitive cost per print, is desired in the industry. Additionally, pigmented inks, as compared to dye based inks, have enhanced properties such as colorfastness, lightfastness, image durability, etc., when exposed to extreme weather conditions, for example, those present in an outdoor environment. However, conventional aqueous (water) based pigmented inks having low viscosity, a characteristic that makes these inks suitable for ejection from thermal inkjet printheads, have difficulty wetting and adhering directly to non-porous, uncoated hydrophobic media. This is because an ink drop can be heated to a temperature approaching of 300° C. (for a brief time period) in a thermal inkjet printing system which typically leads to kogation of the ink and printhead nozzle malfunction. As such, the industry is challenged to produce inkjet ink compositions having improved image quality characteristics that can adhere to non-porous, untreated, uncoated hydrophobic media and thermal inkjet printing systems capable of delivering these inks to the media.

U.S. Pat. No. 5,734,392, issued to Cornell on Mar. 31, 1998, maintains operating temperatures by heating a thermal inkjet printhead. A silicon chip has embedded resistors (commonly referred to as substrate heaters) positioned at opposite ends of two rows of nozzle bores. Each nozzle bore has an associated drop forming resistor which vaporizes a portion of the liquid ink under the nozzle bore causing an ink drop to be ejected from the nozzle bore. Typically, conventional water based pigmented inks are heated by this printhead to a temperature not exceeding 50° C. in order to create a favorable operating environment without causing the inks to overheat. Overheating of the inks creates a larger than desired ejected ink drop size which, in turn, can create undesired image artifacts on a recording media reducing the quality of the printed image.

U.S. Pat. No. 6,382,759 B2, issued to Maeda et al. on May 7, 2002, discloses an inkjet recording apparatus having a heater that heats a recording material to a predetermined temperature range at an ink recording position. The apparatus also includes a printhead that ejects ink to the recording material when the recording material is located at the recording position. The ink ejected by the printhead contains a substance that thickens when exposed to heat. The apparatus also includes a measuring means for monitoring the duration of time the printhead is located at the recording position. Additionally, a means for controlling the duration that the printhead remains at the recording position is included in the apparatus in order to prevent the nozzles and/or other portions of the printhead from being adversely affected by the heat. The ink used with this apparatus has a reversible temperature viscosity relationship. That is, the viscosity of the ink increases when the ink is exposed to heated conditions which causes the ink to gel and remain on the surface of the recording material. However, if the ink contained inside the printhead is allowed to increase in temperature, that ink will also gel and clog the nozzle of the printhead. Accordingly, the printhead must be repositioned away from the recording position periodically and allowed to cool to an acceptable temperature.

U.S. Pat. No. 4,970,528, issued to Beaufort et al. on Nov. 13, 1990, discloses a paper handling and ink drying apparatus which is part of a page width inkjet printer. An omnidirectional source of heat is positioned adjacent the paper exit path of an inkjet printer capable of radiating heat about an 180 degree contoured area relative to the location of the heat source. Paper from the inkjet printer is passed over this 180 degree contoured area as it exits the inkjet printer and moves toward a paper receiving and stacking area. The movement of the paper over the 180 degree contoured area is achieved by providing a semi-cylindrical contoured heat reflector which is an integral part of the printer apparatus.

Aqueous based ink compositions containing polymeric binders, for example those disclosed in U.S. Pat. No. 5,133,803, issued to Moffatt on Jul. 28, 1992, U.S. Pat. No. 5,364,462, issued to Crystal et al. on Nov. 15, 1994, and U.S. Pat. No. 6,239,193, issued to Cheng et al. on May 29, 2001, are also known in the art. However, the binders added to these ink compositions are in very low concentration because adding a high concentration of binder increases the viscosity of the ink composition causing ink kogation and nozzle clogging which creates ink ejection problems when the inks are ejected through thermal inkjet heads.

As such, there is a need for a thermal inkjet printing apparatus using aqueous based pigmented inks capable of wetting and adhering directly to non-porous, uncoated, untreated hydrophobic media having improved image quality characteristics.

SUMMARY OF THE INVENTION

The present invention relates to a thermal inkjet apparatus and method adapted to be used with an inkjet ink comprising pigment, aqueous vehicle, and a sufficient amount of polymeric binder to wet and directly adhere to non-porous, uncoated, untreated, hydrophobic media capable of being ejected through a thermal inkjet head with consistent image quality and no kogation or nozzle clogging. The concentration of binder raises the viscosity of the ink at room temperature. As such, the apparatus is adapted to lower the viscosity of the ink prior to the ink being ejected through the thermal inkjet printhead. Additionally, the apparatus is adapted to prepare the media for receiving the ink, and dry the ink after the ink is deposited on the media.

According to a feature of the present invention, an ink cartridge includes a housing with portions of the housing defining an ink chamber having a nozzle bore. The housing is adapted to heat ink located in the chamber to a temperature exceeding 50° C. An ink is located in the ink chamber. The ink is adapted to be heated to the temperature exceeding 50° C. such that the ink is optimized for ejection through the nozzle bore in the form of an ink drop after the ink is heated to the temperature exceeding 50° C.

According to another feature of the present invention, an inkjet printing system includes a printhead. A platen is positioned relative to the printhead with portions of the platen defining a path to convey media by the printhead. The platen includes a first heater located upstream from the printhead adapted to heat the media to a first temperature prior to the media reaching the printhead. The platen includes a second heater positioned downstream from the printhead adapted to heat the media to a second temperature after the media passes the printhead. The second temperature is greater than the first temperature.

According to another feature of the present invention, a method of printing includes heating a hydrophobic media to a first temperature; depositing ink onto the hydrophobic media; heating the hydrophobic media having ink deposited thereon to a second temperature such that the ink begins to dry, the second temperature being higher than the first temperature; and heating the hydrophobic media having ink deposited thereon to a third temperature such that the ink dries completely, the third temperature being higher than the second temperature. Additionally, the method can also include heating the ink prior to depositing the ink on the hydrophobic media.

BRIEF DESCRIPTION OF THE DRAWINGS

Other features and advantages of the present invention will become apparent from the following description of the preferred embodiments of the invention and the accompanying drawings, wherein.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

Any surface of a material that is repellent to water is said to be hydrophobic. When water is applied to that surface, the water drops bead up and tend to separate from the surface it is in contact with. Examples of hydrophobic substrates are vinyl, polyolefins in general, and teflon. Additionally, as used herein, the term "redisperse itself" means that the polymeric binder within the ink, if it becomes partially solidified or skimmed within the bulk ink, will be liquefied when it comes in contact with the rest of the bulk ink and again becomes dispersed within the ink, for example when printing resumes. Hence, viscosity of the ink will not be adversely affected or changed. Also, as used herein, the term "printing directly to hydrophobic substrates" means that hydrophobic substrates like vinyl, are not treated with special ink jet coating agents, yet the ink is capable of wetting and adhering on the surface yielding good print quality.

Figure 1:
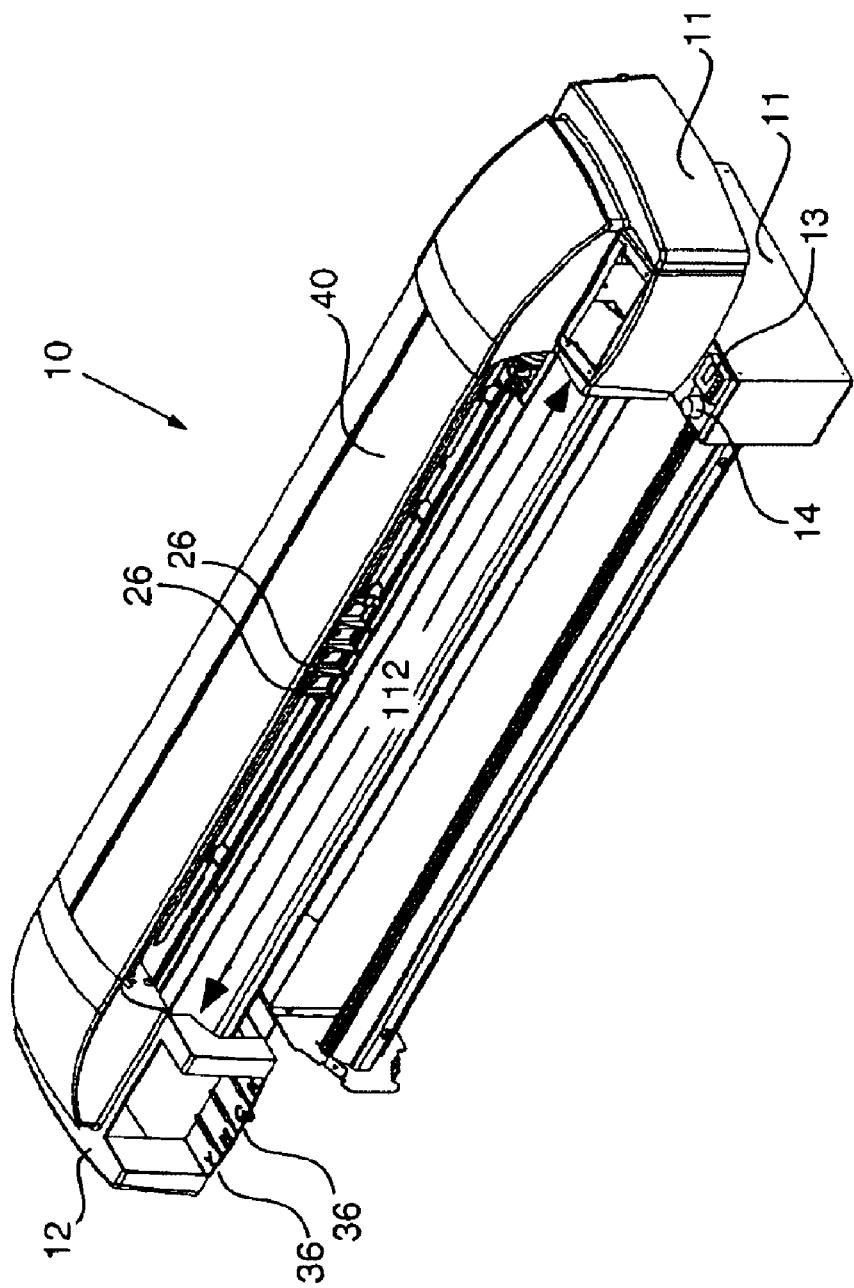
FIG. 1 is a perspective view of a printer made in accordance with the present invention.
Figure 2:
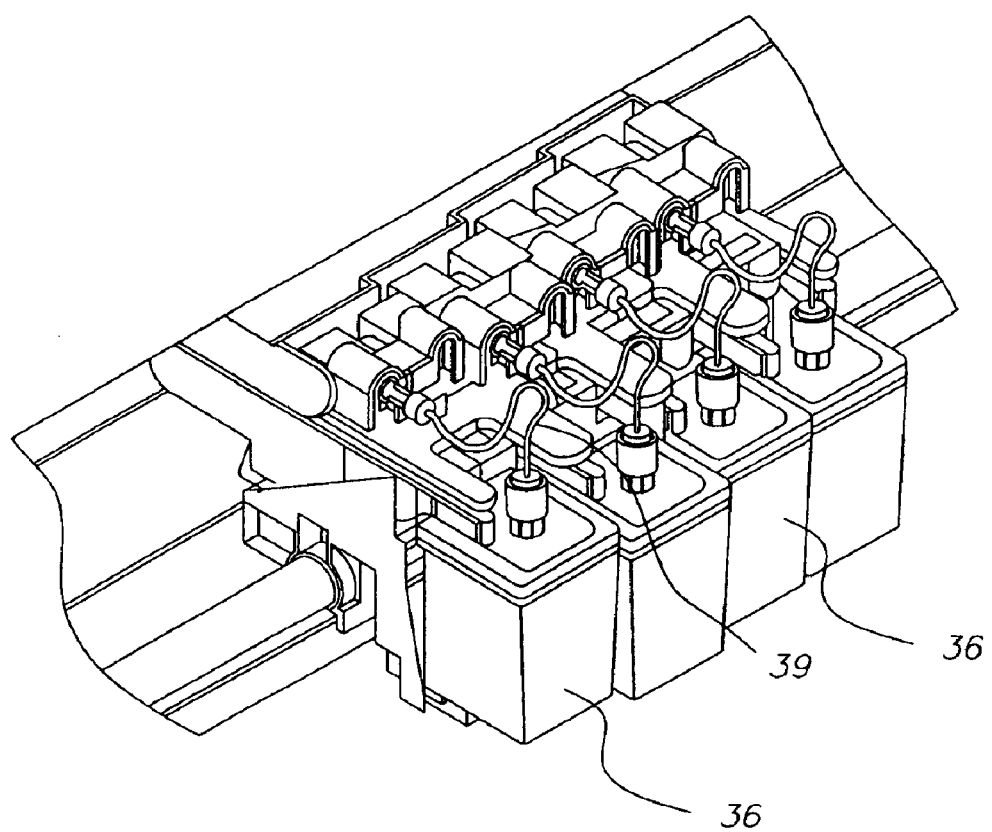
FIG. 2 is a perspective view of ink reservoir cartridges positioned in the ink reservoir of the printer shown in FIG. 1.

Referring to FIGS. 1 and 2, an embodiment of a large format inkjet printer 10 includes right and left side housings 11, 12, and is supported by a pair of legs (not shown). The right housing 11 includes a display and keypad 13 for operator input and control, encloses various electrical and mechanical components related to the operation of the printer device. The right side housing 11 also includes a temperature control 14 used to regulate the temperature of each inkjet cartridge 26 (discussed in more detail below). The left housing 12 encloses ink reservoirs 36 which feed ink to the inkjet cartridges 26 via plastic conduits 38, 39 (shown in FIGS. 2 and 3) which run between each inkjet cartridge 26 and each ink reservoir 36. In other printer embodiments, no separate ink reservoirs 36 or tubing 38, 39 is provided, and printing is performed with ink reservoirs integral to the cartridges. The printer 10 also includes a cover 40.

Figure 3:
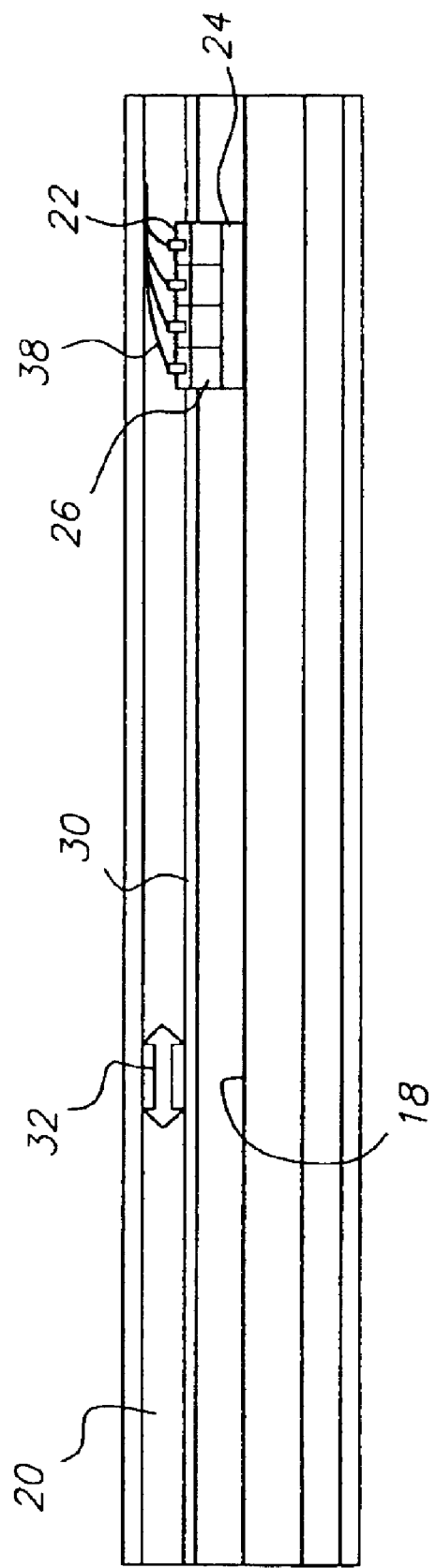
FIG. 3 is front view of a portion of the printer shown in FIG. 1 with the cover removed.

Referring to FIG. 3, either a roll of continuous print media (not shown) is mounted to a roller on the rear of the printer 10 to enable a continuous supply of paper to be provided to the printer 10 or individual sheets of paper (not shown) are fed into the printer 10. A platen 18 forms a horizontal surface which supports the print media, and printing is performed by select deposition of ink drops onto the paper. During operation, a continuous supply of paper is guided from the roll of paper mounted to the rear of the printer 10 across the platen 18 by a plurality of upper rollers (not shown) which are spaced along the platen 18. In an alternate embodiment, single sheets of paper or other print media are guided across the platen 18 by the rollers (not shown). A support structure 20 is suspended above the platen 18 and spans its length with sufficient clearance between the platen 18 and the support structure 20 to enable a sheet of paper or other print media which is to be printed on to pass between the platen 18 and the support structure 20.

The support structure 20 supports a print carriage 22 above the platen 18. The print carriage 22 includes a plurality of inkjet cartridge holders 24, each with a replaceable inkjet cartridge 26 mounted therein. In a preferred embodiment, four print cartridges 26 are mounted in the holders 24 on the print carriage 22, although it is contemplated that any number inkjet cartridges 26 may be provided. The support structure 20 generally comprises a guide rod 30 positioned parallel to the platen 18. The print carriage 22 preferably comprises split sleeves which slidably engage the guide rod 30 to enable motion of the print carriage 22 along the guide rod 30 to define a linear printing path, as shown by the bi-directional arrow 32, along which the print carriage 22 moves. A motor and a drive belt mechanism (not shown) are used to drive the print carriage 22 along the guide rod 30.

During printing, print carriage 22 passes back and forth over the media. During each pass, the inkjet cartridges 26 deposit a swath of ink having a width approximately equal to the width of the inkjet nozzle array of the jet plate on the bottom of the cartridge. After each pass, the media is incremented, and the carriage is passed back over the media to print the next swath. Depending on the printing mode, the inkjet cartridges 26 can print during passes in only one or both directions. Furthermore, in multi-pass print modes, the inkjet cartridges 26 may pass over the same location of the media more than once. These aspects of inkjet printers are well known and conventional, and will thus not be explained in further detail herein.

Figure 4:
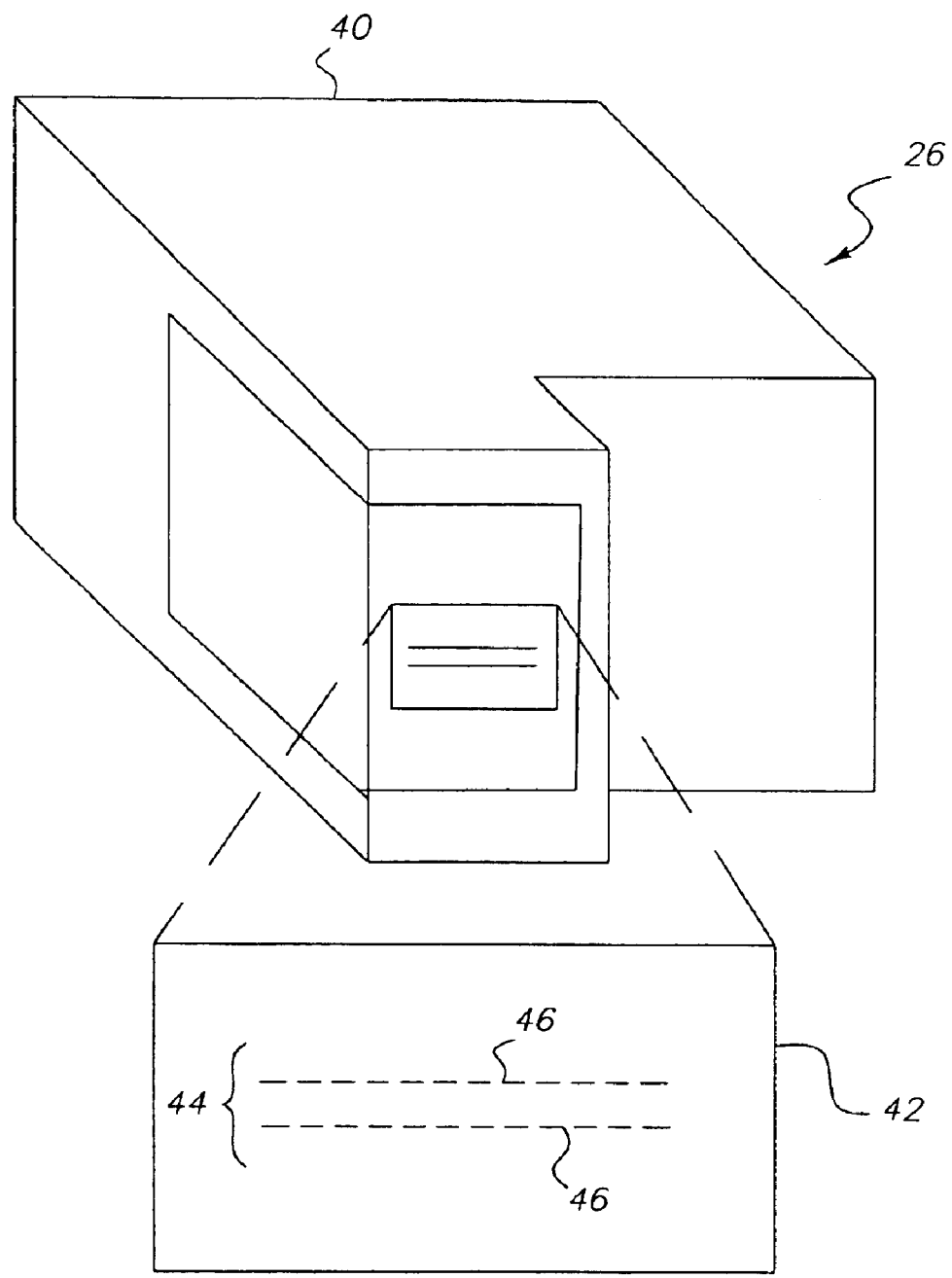
FIG. 4 is a prior art schematic perspective view of the replaceable ink cartridge shown in FIG. 3.

Referring to FIG. 4, the replaceable inkjet cartridge 26 includes a housing 40 containing ink and a nozzle plate 42. Nozzle plate 42 has a substantially linear array of nozzles 44. In one embodiment of the large format inkjet printer 10, the nozzle array 44 includes two substantially parallel columns of nozzles 46. However, other embodiments of the large format inkjet printer 10 can have one, three, or more columns of nozzles 46. The replaceable inkjet cartridge 26 forms images on the media by selectively ejecting ink drops from the nozzles 46 in the nozzle array 44 as the replaceable inkjet cartridge 26 translates across the media in a direction generally perpendicular to the direction of alignment of the nozzle array 44.

Figures 5A, 5B:
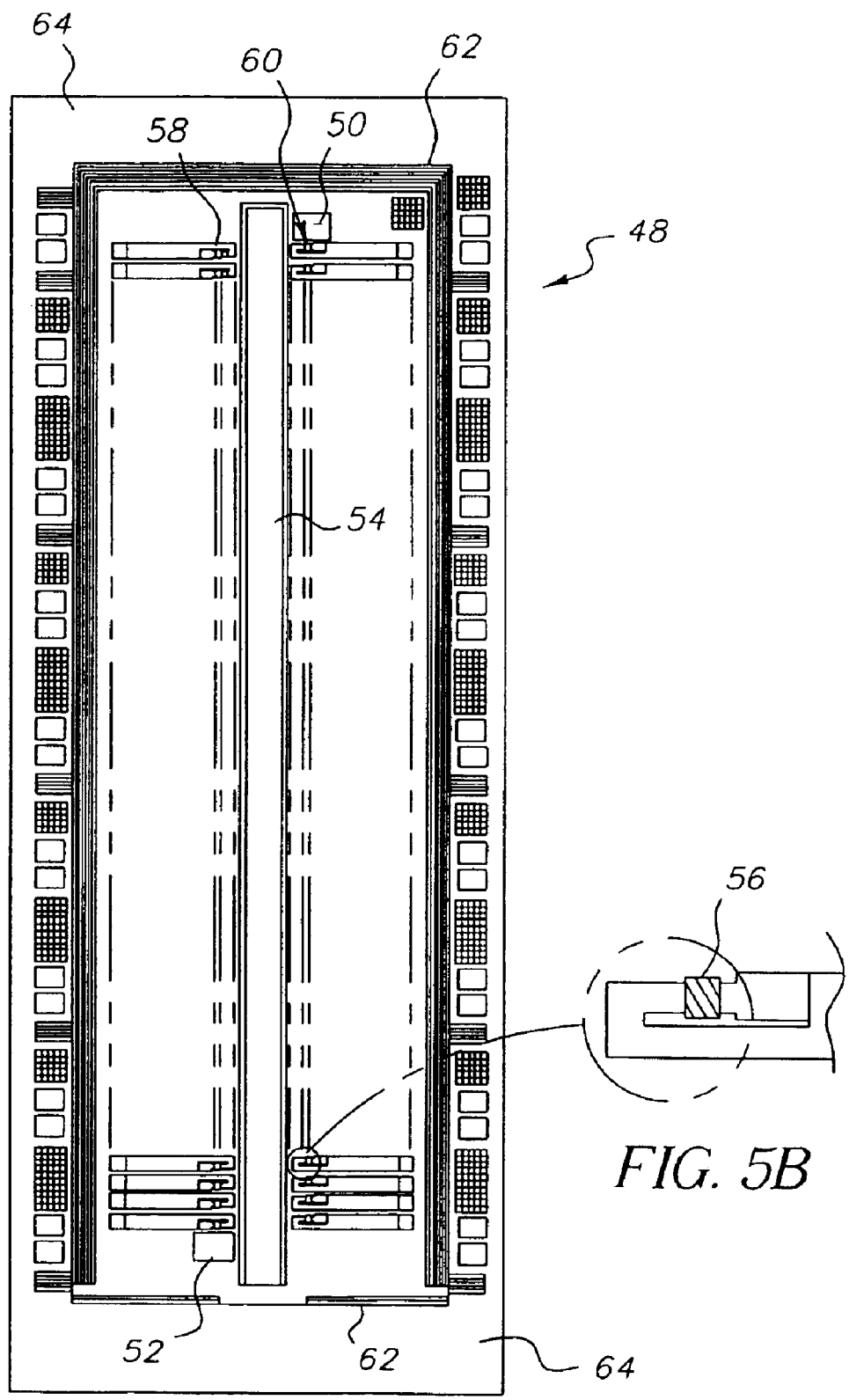
FIGS. 5A and 5B are prior art views of the nozzle head portion of the ink cartridge shown in FIG. 4.

Referring to FIGS. 5A and 5B, a silicon integrated circuit chip 48 is positioned behind nozzle plate 42 in the replaceable inkjet cartridge 26. Chip 48 includes substrate heaters 50 and 52 (for example, embedded resistors) positioned at opposite ends of the chip 48. Substrate heaters 50 and 52 heat the cartridge 26 and the ink in housing 40 to a predetermined temperature. Chip 48 also includes a channel 54 to deliver ink past ink drop forming resistors 56 (shown in FIG. 5B) positioned in two columns 58 and 60. Nozzle plate 42 is positioned so that each nozzle 44 is located proximate to a corresponding resistor 56. Actuating resistor 56 by applying a voltage to resistor 56 vaporizes a portion of the ink under a corresponding nozzle 44 causing a drop of ink to be ejected through nozzle 44. Chip 48 also includes a temperature sensor 62 (for example, a resistor made from a heat responsive metal such as aluminum) positioned around the outside edges 64 of the chip 48 that measures current through sensor 62 at controlled voltages. As such, the temperature of the cartridge 26 and the ink in housing 40 can be monitored, controlled, and maintained. Cartridge 26 is commercially available from Lexmark International, Inc., Lexington, Ky.

Chip 48 can be populated with control leads and drive FET transistors as is known in the industry. Additionally, chip 48 can be fabricated using ion implant or other standard techniques of semiconductor circuit fabrication.

Figure 6:
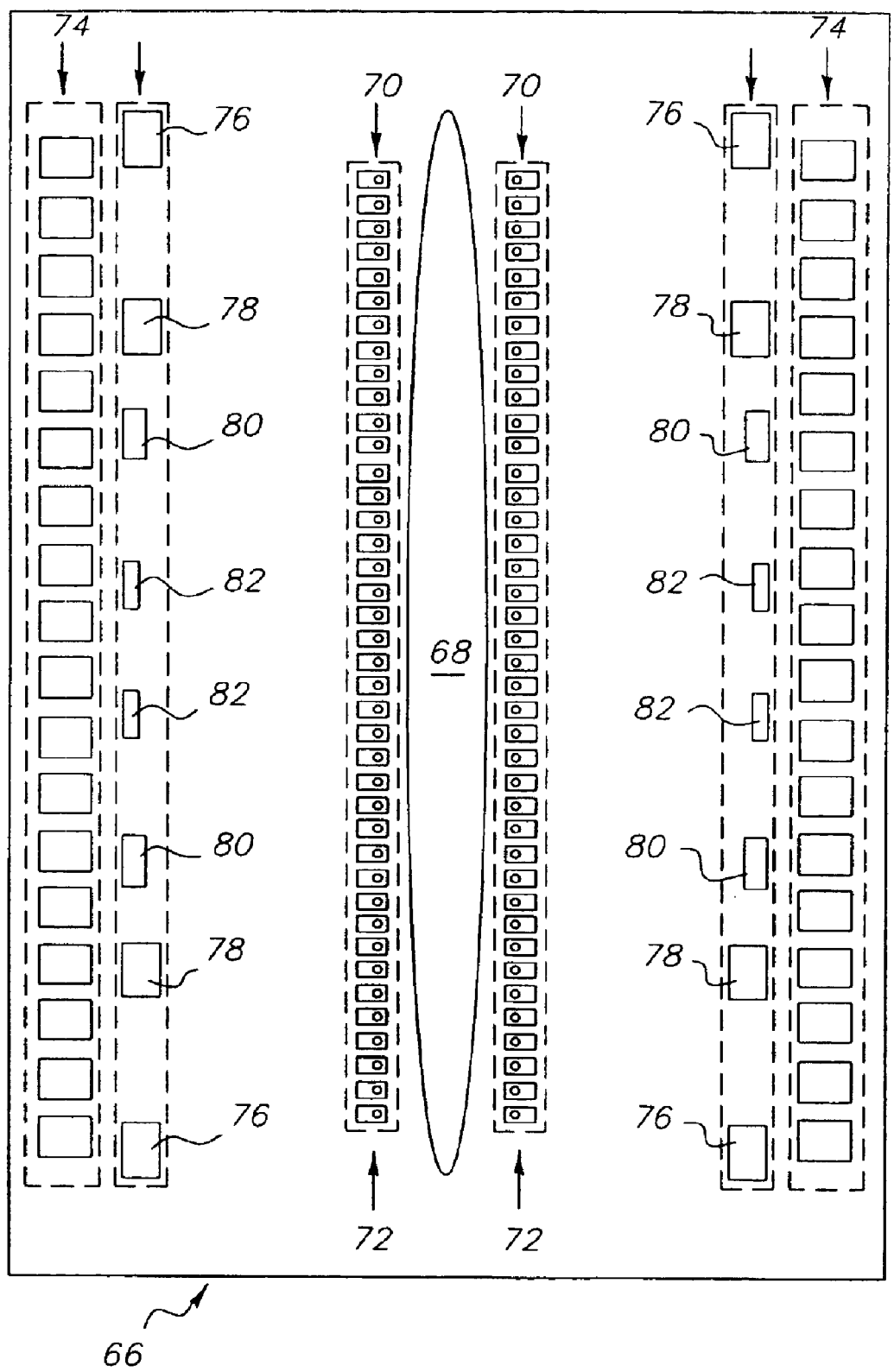
FIG. 6 is a prior art view of an alternative embodiment of the nozzle head portion of the ink cartridge shown in FIG. 4.

Referring to FIG. 6, an alternative embodiment of chip 48 is shown. Chip 66 includes an ink channel 68 located in the middle of chip 66 that provides ink past drop forming resistors 70. Typically, there is one drop forming resistor 70 per nozzle 46 of nozzle array 72. Nozzle array 72, shown for position reference relative to drop forming resistors 70 only, is positioned over chip 66. Chip 66 includes input/output (I/O) contact pads 74 located on its outer edges which provide electrical contact points between components of chip 66 and components of the print cartridge 26 and/or printer 10 located removed from chip 66. Chip 66 also includes a plurality of substrate heaters 76, 78, 80, 82 (for example, a resistor made from tantalum aluminum) which generate heat to warm the chip 66 and the ink in the housing of cartridge 26 when a voltage is applied to substrate heaters 76, 78, 80, 82.

Substrate heaters can be arranged substantially parallel to nozzle array 72 between drop forming resistors 70 and contact pads 74. Additionally, the resistance value for each substrate heater substrate heaters 76, 78, 80, 82 can be selected to control the amount of heat generated by each substrate heaters 76, 78, 80, 82 so as to provide uniform heating across chip 66. For example, substrate heaters 82 can be designed to generate less heat than substrate heaters 76 by providing substrate heater 76 with a lower resistance value than substrate heater 82. Additionally, substrate heater 80 can generate more heat than substrate heater 82 but less heat than substrate heater 78 while substrate heater 78 generates more heat than substrate heater 80 but less than substrate heater 76. This results in uniform heating across chip 66. However, by selecting alternative resistance values for substrate heaters 76, 78, 80, 82 non-uniform heating of chip 66 can also be achieved, if desired.

Figure 7:
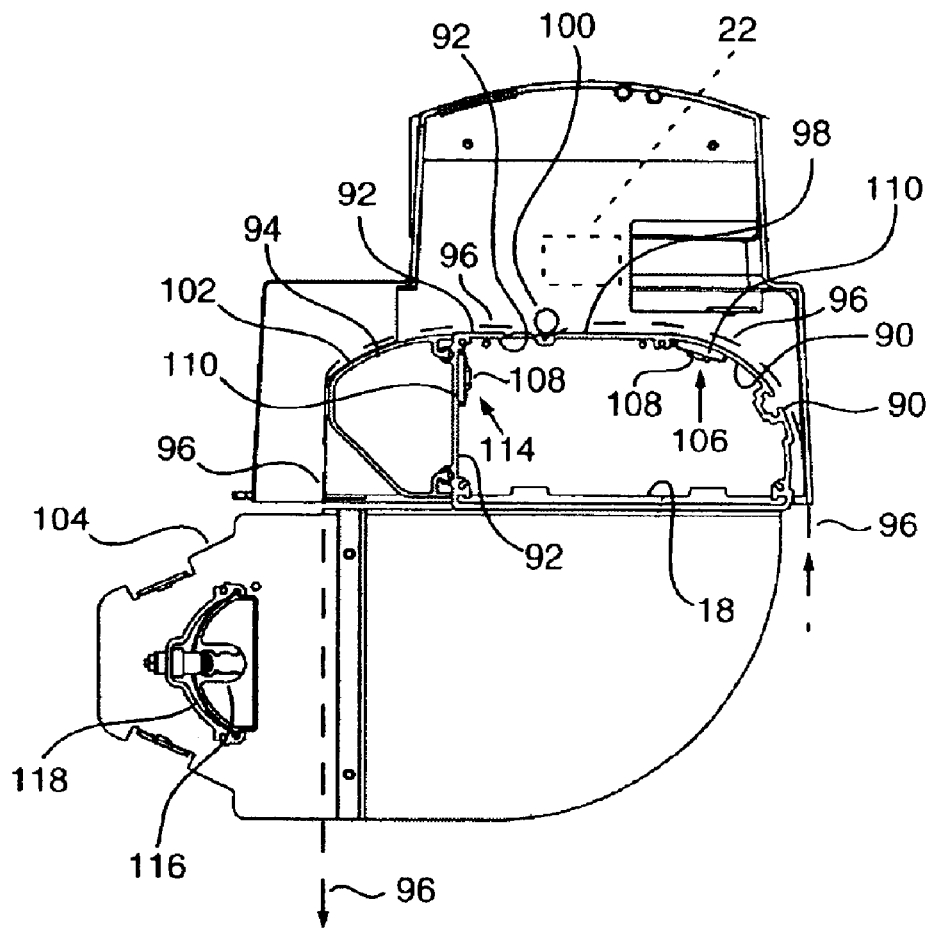
FIG. 7 is a cross sectional side view of the printer shown in FIG. 1 with the right side housing removed.

Referring to FIG. 7 and back to FIG. 1, platen 18, made from a heat conductive material such as aluminum, etc., has a back portion 90, a front portion 92, and a bull nose portion 94, typically made from plastic, attached to front portion 92. Platen 18 defines a media conveyance path 96 over an outer platen surface 98 beginning from the back portion 90, passing under roller 100, and continuing toward bull nose portion 94. Media conveyance path 96 continues over an outer surface 102 of bull nose portion 94 ending after passing by curing heater 104. The media conveyance path 96 also passes under print carriage 22. This area is commonly referred to as a media/carriage interaction area.

A first heater 106 is attached to the back portion 90 of the platen 18 upstream from print carriage 22 along the media conveyance path 96. Heater 106 includes a plastic heating strip 108 attached (using glue, etc.) to a heat conducting metal 110 (aluminum, etc.). Heater 106 is then fixed to platen 18 opposite platen surface 98 using any appropriate attachment device (screws, bolt, glue, etc.). Plastic heating strip 108 is commercially available from Minco Products, Inc., Minneapolis, Minn. Plastic heating strip 108 can be rigid or flexible and can be encased in silicone. Plastic heating strip 108 is adapted to heat the back portion 90 of platen 18 to a range of 40° C. to 60° C., more preferably to a range of 45° C. to 55° C., and even more preferably to approximately 50° C. Heating the back portion 90 of the platen 18 heats the hydrophobic media to substantially similar temperatures which prepares the media for printing by reducing media deformation (buckling, or otherwise becoming uneven relative to the platen surface 98) as the media travels over platen 18. Heater 106 extends over the length 112 (shown in FIG. 1) of platen 18 so that all areas of the media are heated. Positioning first heater 106 in the location shown in FIG. 7 optimizes servicing of first heater 106. This can be contrasted with other positioning locations, for example, positioning in the media/carriage interaction area which are more difficult areas to access for servicing. First heater 106 operates independently of curing heater 104. As such, the temperature of the back portion 90 of platen 18 remains constant in the ranges described above throughout the printing process.

A second heater 114 is attached to the front portion 92 of the platen 18 downstream from print carriage 22 along the media conveyance path 96. Heater 114 includes a plastic heating strip 108 attached (using glue, etc.) to a heat conducting metal 110 (aluminum, etc.). Heater 114 is then fixed to platen 18 on a surface other than platen surface 98 using any appropriate attachment device (screws, bolt, glue, etc.). Plastic heating strip 108 is commercially available from Minco Products, Inc., Minneapolis, Minn. Plastic heating strip 108 can be rigid or flexible, and can be encased in silicone. Heating strip 108 is adapted to heat the front portion 92 of platen 18 to a range of 40° C. to 100° C., more preferably to a range of 50° C. to 80° C., and even more preferably to a range of 60° C. to 70° C. Heater 114 extends over the length 112 (shown in FIG. 1) of platen 18 so that all areas of the media are heated. Heating the front portion 90 of the platen 18 heats the hydrophobic media to substantially similar temperatures which initiates drying of the ink deposited on the media. The pigments and binders present in the ink begin to set when exposed to the above described temperature ranges. This helps to prevent the ink deposited on the media from running or bleeding together. Positioning second heater 114 is the location as shown in FIG. 7 optimizes servicing of second heater 114. This can also be contrasted with other positioning locations, for example, positioning in the media/carriage interaction area which are more difficult areas to access for servicing. Second heater 114 operates independently of curing heater 104. As such, the temperature of the front portion 92 of platen 18 remains constant in the ranges described above throughout the printing process.

Curing heater 104 is positioned downstream from second heater 114 along the media conveyance path 96. Curing heater 104 provides radiant heat in one direction directly to ink deposited on the media. As such, curing heater 104 is positioned facing the ink receiving side of the media. Curing heater 104 includes an infrared heating element, made from Ni-Chrom-Al wire 116 for example, and a reflector 118. Curing heater 104 exposes deposited ink to temperatures in a range of 80° C. to 130° C., more preferably to temperatures in a range of 90° C. to 120° C., and more preferably to temperatures greater than or equal to 110° C. Exposing the ink to the temperatures described above evaporates the aqueous vehicle and solvent components of the ink, allowing the remaining binders and resins to completely dry (in that the ink is at least not tacky to the touch) prior to the printed media exiting the interaction area of the curing heater 104. Curing heater 104 also extends over the length 112 (shown in FIG. 1) of platen 18 so that all areas of the media are heated. Curing heater 104 is commercially available from Ogden Manufacturing Co., Arlington Heights, Ill. Curing heater 104 also operates independently of other heating components of printer 10. As such, the temperature of the curing heater interaction area remains constant in the ranges described above throughout the printing process.

The ink, used with the thermal inkjet printer 10 described above, has a composition suitable for use in printing directly to untreated hydrophobic media. The ink composition comprises a colorant; an aqueous vehicle that contains at least 40 weight percent water and at least 5 weight percent humectant, based on the total weight of the ink composition; and a binder comprising one or more polymers, the binder being capable of redispersing itself in the ink. One embodiment of the ink includes 60 grams of thermal outdoor printing ink pigment; 20 grams of deionized water; 12 grams of DEG; 7.2 grams of 2P; 4.8 grams of NMP; 0.2 grams of Surfynol DF75 (a defoamer); and 4.4 grams of Binder-S (a spectra color binder).

The colorant of the ink can be either a dye or a pigment, for example, carbon black, quinacridone, red 122, diazo pigment, yellow 74, copper phthalocyanine, and/or blue 15:3. Pigment concentration in the ink composition ranges from 1%–15%, preferably 2%–10%, and most preferred from 3%–7% by weight based on the weight of the total ink composition.

The binder of the ink can include an acrylic polymer, a polyurethane, a blend of an acrylic polymer and a polyurethane, or a thermoplastic resin. The optimum binder concentration ranges from 0.5 percent to 30 percent by weight of the total ink composition while the binder to pigment ratio ranges from 1:20 to 20:1. The binder can also have a glass transition temperature from 60 degrees F. to 80 degrees F. and an average molecular weight of 25000 to 29000. Additionally, the humectant can be a glycol or a pyrrolidone that is miscible with water, for example diethylene glycol (DEG), 2-pyrrolidone (2P), or n-methyl pyrrolidone (NMP). When the humectant is miscible with water, the humectant constitutes 5 to 40 weight percent, based on the total weight of the ink composition. The aqueous vehicle comprises 40–90 weight percent water, based on the total weight of the ink composition.

Additionally, the ink has a viscosity of between 2 and 5 cps, more preferably, between 2 and 3 cps, and still more preferably of between 2 and 2.75 cps, as measured at the temperatures described in Table 1 below. Additionally, the ink has a viscosity of between 1 and 2.75 cps, as measured at a temperature of equal to or greater then 70° C.

TABLE 1

| | Temperature | | | | |
|---|---|---|---|---|---|
| COLOR | 25° C. | 35° | 45° | 55° | 65° |
| BLACK | 4.05 | 3.43 | 3.28 | 2.92 | 2.64 |
| CYAN | 3.54 | 2.9 | 2.71 | 2.54 | 2.24 |
| MAGENTA | 3.72 | 3.21 | 2.84 | 2.73 | 2.49 |
| YELLOW | 3.58 | 3.03 | 2.66 | 2.31 | 2.04 |

The binder component of the ink allows the ink to adhere to untreated hydrophobic media, for example vinyl. However, the binder also causes the viscosity to increase at room temperature, making it extremely difficult for the ink to be ejected from a thermal inkjet cartridge 26, described above. As such, the ink is heated while ink cartridge 26 in order to lower the viscosity to the ranges described above, thus allowing the ink to be ejected from cartridge 26. The ink is heated to a temperature exceeding 50° C., more preferably to a range of 60° C. to 80° C., and still more preferably to a range of 70° C. to 80° C. The desired temperature can be controlled using temperature control 14. Although these temperatures exceed the heating temperatures for conventional inks used in thermal inkjet printing, the ink here, and the quality of the resulting image, is not adversely affected because of the presence of the binder. The heated environment of the platen 18, described above, also helps to keep the ink viscosity reduced prior to ink ejection.

The printing operation will now be described. Untreated hydrophobic media is fed into the back portion 90 of platen 18 where the media is heated to the temperatures described above. When the media is appropriately positioned relative to print carriage 22, ink is ejected from cartridge 26 onto the media. The ink has been heated to the temperatures described above, allowing the ink to be ejected from cartridge 26. The media is then heated to a higher temperature, as described above, as it moves toward front portion 92 of platen 18. This initiates the ink drying process and reduces the likelihood of the ink bleeding or running. Next, the media passes curing heater 104 which radiates heat in one direction directly to the ink located on the media to finish the drying process. An additional step of laminating the printed media can occur at this time, if desired.

The invention has been described in detail with particular reference to certain preferred embodiments thereof, but it will be understood that variations and modifications can be effected within the scope of the invention.

What is claimed is:

1. An inkjet printing system comprising:
   a printhead comprising an ink cartridge having a housing, portions of the housing defining an ink chamber having a nozzle bore, the housing being operable to heat an ink comprising a binder located in the ink chamber to a temperature exceeding 50° C., the ink being optimized for ejection through the nozzle bore in the form of an ink drop after the ink is heated to the temperature exceeding 50° C.; and
   a platen positioned relative to the printhead, portions of the platen defining a path to convey media by the printhead, the platen including a first heater located upstream from the printhead, the first heater being operable to heat the media to a first temperature prior to the media reaching the printhead, the platen including a second heater positioned downstream from the printhead, the second heater being operable to heat the media to a second temperature after the media passes the printhead, the second temperature being greater than the first temperature, wherein the binder is present in the ink in a concentration sufficient to give the ink a viscosity of at least 3.50 cps as measured at a temperature of 25° C. and a viscosity of less than 2.65 cps as measured at a temperature of 65° C.

2. The inkjet system according to claim 1, the platen having a first surface and a second surface, wherein the media passes over the first surface and the first heater is attached to the second surface.

3. The inkjet system according to claim 2, wherein the second heater is attached to the second surface.

4. The inkjet system according to claim 1, wherein the first and second heaters include a plastic heating strip attached to a heat conducting metal.

5. The inkjet system according to claim 1, wherein the first temperature is in a range of from 40° C. to 60° C.

6. The inkjet system according to claim 1, wherein the first temperature is in a range of from 45° C. to 55° C.

7. The inkjet system according to claim 1, wherein the first temperature is approximately 50° C.

8. The inkjet system according to claim 1, wherein the second temperature is in a range of from 40° C. to 100° C.

9. The inkjet system according to claim 1, wherein the second temperature is in a range of from 50° C. to 80° C.

10. The inkjet system according to claim 1, wherein the second temperature is in a range of from 60° C. to 70° C.

11. The inkjet system according to claim 1, the printhead being adapted to deposit ink on the media, further comprising:
    a third heater positioned adjacent to the media path and downstream from the second heater, wherein the third heater faces a media surface having ink deposited thereon such that heat generated by the third heater directly heats the ink deposited on the media.

12. The inkjet system according to claim 11, wherein the third heater is an infrared heater.

13. The inkjet system according to claim 11, wherein the third heater heats the ink to a third temperature, the third temperature being greater than the second temperature.

14. The inkjet system according to claim 13, wherein the third temperature is in a range of from 80° C. to 130° C.

15. The inkjet system according to claim 13, wherein the third temperature is in a range of from 90° C. to 120° C.

16. The inkjet system according to claim 13, wherein the third temperature is approximately greater than or equal to 110° C.

17. The inkjet system according to claim 1, wherein the housing includes a heater operable to heat the ink to a temperature exceeding 50° C.

18. The inkjet system according to claim 17, wherein the housing includes a plurality of nozzle bores positioned in a nozzle row, a first heater being located at a first end of the nozzle row and a second heater located at a second end of the nozzle row.

19. The inkjet system according to claim 1, wherein the housing is operable to heat the ink to a temperature of between 60° C. to 80° C.

20. The inkjet system according to claim 1, wherein the ink has an initial viscosity of approximately 3.5 cps to approximately 4.5 cps as measured at a temperature of 25° C. and a viscosity after being heated of approximately 2.0 cps to approximately 2.75 cps as measured at a temperature of 65° C.

21. The inkjet system according to claim 1, wherein the ink includes a binder of at least one polymer.

22. The inkjet system according to claim 21, wherein the ink includes a pigment.

23. The inkjet system according to claim 22, wherein the binder to the pigment ratio is in a range of from 1:20 to 20:1.

24. The inkjet system according to claim 21, wherein the binder is adapted to redisperse itself in the ink.

25. An inkjet printing system comprising:
    a printhead;
    a platen positioned relative to the printhead, portions of the platen defining a path to convey media by the printhead, the platen including a first heater located upstream from the printhead, the first heater being operable to heat the media to a first temperature prior to the media reaching the printhead, the platen including a second heater positioned downstream from the printhead, the second heater being operable to heat the media to a second temperature after the media passes the printhead, the second temperature being greater than the first temperature; and a third heater positioned adjacent to the media path and downstream from the second heater, the third heater facing a media surface having ink deposited thereon such that heat generated by the third heater directly heats the ink deposited on the media, the third heater being operable to heat the ink to a third temperature, the third temperature being greater than the second temperature, wherein the third temperature is in a range of from 80° C. to 130° C.

26. An inkjet printing system comprising:

a printhead;

a platen positioned relative to the printhead, portions of the platen defining a path to convey media by the printhead, the platen including a first heater located upstream from the printhead, the first heater being operable to heat the media to a first temperature prior to the media reaching the printhead, the platen including a second heater positioned downstream from the printhead, the second heater being operable to heat the media to a second temperature after the media passes the printhead, the second temperature being greater than the first temperature; and a third heater positioned adjacent to the media path and downstream from the second heater, the third heater facing a media surface having ink deposited thereon such that heat generated by the third heater directly heats the ink deposited on the media, the third heater being operable to heat the ink to a third temperature, the third temperature being greater than the second temperature, wherein the third temperature is approximately greater than or equal to 110° C.

27. An inkjet printing system comprising:

a printhead comprising an ink cartridge having a housing, portions of the housing defining an ink chamber having a nozzle bore, the housing being operable to heat an ink located in the ink chamber to a temperature exceeding 50° C., the ink being optimized for ejection through the nozzle bore in the form of an ink drop after the ink is heated to the temperature exceeding 50° C.; and a platen positioned relative to the printhead, portions of the platen defining a path to convey media by the printhead, the platen including a first heater located upstream from the printhead, the first heater being operable to heat the media to a first temperature prior to the media reaching the printhead, the platen including a second heater positioned downstream from the printhead, the second heater being operable to heat the media to a second temperature after the media passes the printhead, the second temperature being greater than the first temperature, wherein the ink has an initial viscosity of approximately 3.5 cps to approximately 4.5 cps as measured at a temperature of 25° C. and a viscosity after being heated of approximately 2.0 cps to approximately 2.75 cps as measured at a temperature of 65° C.

* * * * *